US009933991B2

(12) United States Patent
Olesh et al.

(10) Patent No.: US 9,933,991 B2
(45) Date of Patent: Apr. 3, 2018

(54) REMOTE CONTROLLED DIGITAL AUDIO MIXING SYSTEM

(71) Applicant: Harman International Industries Limited, Hertfordshire (GB)

(72) Inventors: Danny Olesh, Melbourne (AU); John Fuller, Melbourne (AU); Michael Jago, Melbourne (AU)

(73) Assignee: Harman International Industries, Limited, Hertfordshire (GB)

( * ) Notice: Subject to any disclaimer, the term of this patent is extended or adjusted under 35 U.S.C. 154(b) by 0 days.

(21) Appl. No.: 15/066,264

(22) Filed: Mar. 10, 2016

(65) Prior Publication Data

US 2016/0266867 A1    Sep. 15, 2016

Related U.S. Application Data

(60) Provisional application No. 62/130,831, filed on Mar. 10, 2015.

(51) Int. Cl.
```
G06F 3/16       (2006.01)
G06F 3/0484     (2013.01)
G10H 1/00       (2006.01)
G10H 1/46       (2006.01)
```

(52) U.S. Cl.
CPC .......... *G06F 3/165* (2013.01); *G06F 3/04842* (2013.01); *G06F 3/04847* (2013.01); *G10H 1/0008* (2013.01); *G10H 1/46* (2013.01); *G10H 2220/096* (2013.01); *G10H 2220/101* (2013.01); *G10H 2220/106* (2013.01); *G10H 2230/015* (2013.01); *G10H 2240/211* (2013.01)

(58) Field of Classification Search
CPC .......... G06F 3/16; G06F 3/165; H04H 60/04; H04S 1/007; H04S 2400/05; H04S 2400/13; H04S 7/307
USPC ...... 381/61, 107, 119, 310; 709/229; 700/94
See application file for complete search history.

(56) References Cited

U.S. PATENT DOCUMENTS

| 8,886,344 B2* | 11/2014 | Radford | H04H 60/04 700/94 |
|---|---|---|---|
| 9,411,882 B2* | 8/2016 | Cory | H04S 7/30 |
| 2003/0007648 A1* | 1/2003 | Currell | H04S 7/30 381/61 |
| 2007/0269062 A1* | 11/2007 | Rodigast | H04R 1/403 381/310 |
| 2010/0150359 A1* | 6/2010 | KnicKrehm | G01H 7/00 381/58 |

(Continued)

*Primary Examiner* — Mohammad Islam
(74) *Attorney, Agent, or Firm* — Brooks Kushman, P.C.

(57) ABSTRACT

An audio mixing system for providing an audio processing interface at a mobile device may include a mobile device including an interface configured to present a display screen to receive user input to control a remote audio mixer that is operably coupled to at least one musical instrument, transmit, via a wireless network, a mobile device command indicating an audio setting, the command being generated in response to user input, receive, via the wireless network and in response to the mobile device command, first mixer data indicative of audio settings of the remote audio mixer, and present an updated display screen, the updated display screen reflecting the first mixer data as a result of the mobile device command to present a real-time display of the audio settings of the remote audio mixer.

15 Claims, 18 Drawing Sheets

(56) References Cited

U.S. PATENT DOCUMENTS

| | | | | |
|---|---|---|---|---|
| 2012/0059492 A1* | 3/2012 | Radford | ............... | H04H 60/04 |
| | | | | 700/94 |
| 2012/0284622 A1* | 11/2012 | Avery | ............... | G06F 3/0488 |
| | | | | 715/719 |
| 2012/0288121 A1* | 11/2012 | Matsui | ............... | H03G 3/3089 |
| | | | | 381/107 |
| 2013/0262687 A1* | 10/2013 | Avery | ............... | G06F 9/54 |
| | | | | 709/229 |
| 2014/0029767 A1* | 1/2014 | Jarvinen | ............ | H04B 1/3833 |
| | | | | 381/119 |
| 2014/0133683 A1* | 5/2014 | Robinson | ............... | H04S 3/008 |
| | | | | 381/303 |
| 2014/0254820 A1* | 9/2014 | Gardenfors | ............ | H04R 3/005 |
| | | | | 381/80 |
| 2014/0328485 A1* | 11/2014 | Saulters | ............... | G06F 3/165 |
| | | | | 381/17 |
| 2015/0018993 A1* | 1/2015 | Trivedi | ............... | G11B 27/28 |
| | | | | 700/94 |
| 2016/0127062 A1* | 5/2016 | Chavez | ............... | H04R 3/00 |
| | | | | 381/119 |

\* cited by examiner

REMOTE CONTROLLED DIGITAL AUDIO MIXING SYSTEM

CROSS-REFERENCE TO RELATED APPLICATIONS

This application claims the benefit of U.S. provisional application No. 62/130,831 filed Mar. 10, 2015, the disclosure of which is incorporated in its entirety by reference herein.

TECHNICAL FIELD

Embodiments disclosed herein generally relate to a remote controlled digital audio mixing system.

BACKGROUND

Audio mixing consoles are often used for combining, routing and altering the dynamics of audio signals. A mixing console may receive several audio signals (e.g., vocals, guitar, drums, keyboard, etc.) across various channels at inputs corresponding to each as well as providing various outputs via speakers, amplifiers, etc. Often times, user devices separate from the mixing console may be used to adjust settings such as gains, feedback suppression, etc. However, in order to facilitate control of a mixing console at a user device, often times the console and the user device may be connected via a wired connection. In the event that a wireless connection may be available, a separate router may be required to facilitate the wireless communication between the user device and mixing console.

SUMMARY

A non-transitory computer-readable medium tangibly embodying computer-executable instructions of a software program, the software program being executable by a processor of a computing device to provide operations may include presenting, via a web browser on a mobile device, a display screen to receive user input to control a remote audio mixer that is operably coupled to at least one musical instrument, transmitting, via a wireless network, a mobile device command indicating an audio setting, the command being generated in response to user input at the display screen of the mobile device, receiving, via the wireless network and in response to the mobile device command, first mixer data indicative of audio settings of the remote audio mixer, and presenting an updated display screen on the mobile device, the updated display screen reflecting the first mixer data as a result of the mobile device command to present a real-time display of the audio settings of the remote audio mixer.

An audio mixing system for providing an audio processing interface at a mobile device may include a mobile device including an interface configured to present a display screen to receive user input to control a remote audio mixer that is operably coupled to at least one musical instrument, transmit, via a wireless network, a mobile device command indicating an audio setting, the command being generated in response to user input, receive, via the wireless network and in response to the mobile device command, first mixer data indicative of audio settings of the remote audio mixer, and present an updated display screen, the updated display screen reflecting the first mixer data as a result of the mobile device command to present a real-time display of the audio settings of the remote audio mixer.

An audio mixing system may include an audio mixer including a plurality of input and output ports configured to operably connect to at least one of a musical instrument or speaker, the audio mixer further including at least one wireless access point configured to facilitate wireless communication between the audio mixer and at least one mobile device, the audio mixer further including at least one web server to further facilitate communication with the mobile device via a hyper-text markup language (HTML).

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the embodiments described herein, a remote controlled digital audio mixing system may include an audio mixer having input and output ports. The audio mixer may be portable, taking the form of a stagebox, with minimal onboard controls. The audio mixer may include a built-in router and be capable of wireless communication with a mobile device such as a phone, tablet, personal computer, laptop, etc. Users may access and control settings of the mixer via a hyper text markup language ("HTML") 5 user interface using a web browser onboard the mobile device. Thus, since a web browser may open the user interface, the audio mixer settings may be implemented on any mobile device, regardless of the type, brand, or operating system of the device. No additional device specific application is required. The mobile device may then communicate directly with the audio mixer and apply the desired settings via user interaction at the mobile device. The user interface at the mobile device may be configured to save settings, profiles, mixes, etc., which may be easily recalled and applied.

In one example screen on the mobile device, a dual meter displays both input and output metering simultaneously, reducing the meter footprint in the display and reducing the amount of user interaction necessary to visualize both the input and output.

Furthermore, more than one mobile device may be concurrently controlling the audio mixer. That is, multiple browser windows may operate concurrently and remain in synchronization with one another to control the audio mixer. For example, a single user may have a main mixer page open on a laptop computer while having an equalization edit page open on a tablet. When the user selects a channel volume fader on the laptop, the equalization for the same channel will be available for editing on the tablet. Thus, the channel selection follows across multiple browsers and devices. The system may also facilitate unlimited user configurable identifications and allows multiple users to set up their own unique channel setup.

Accordingly, the audio mixer settings may be remotely managed with any type of device, even one not used with the audio mixer previously. These capabilities create an easy, portable mixing system that may be set-up quickly and accessed easily without the need for applications on a specific device.

Figure 1A:
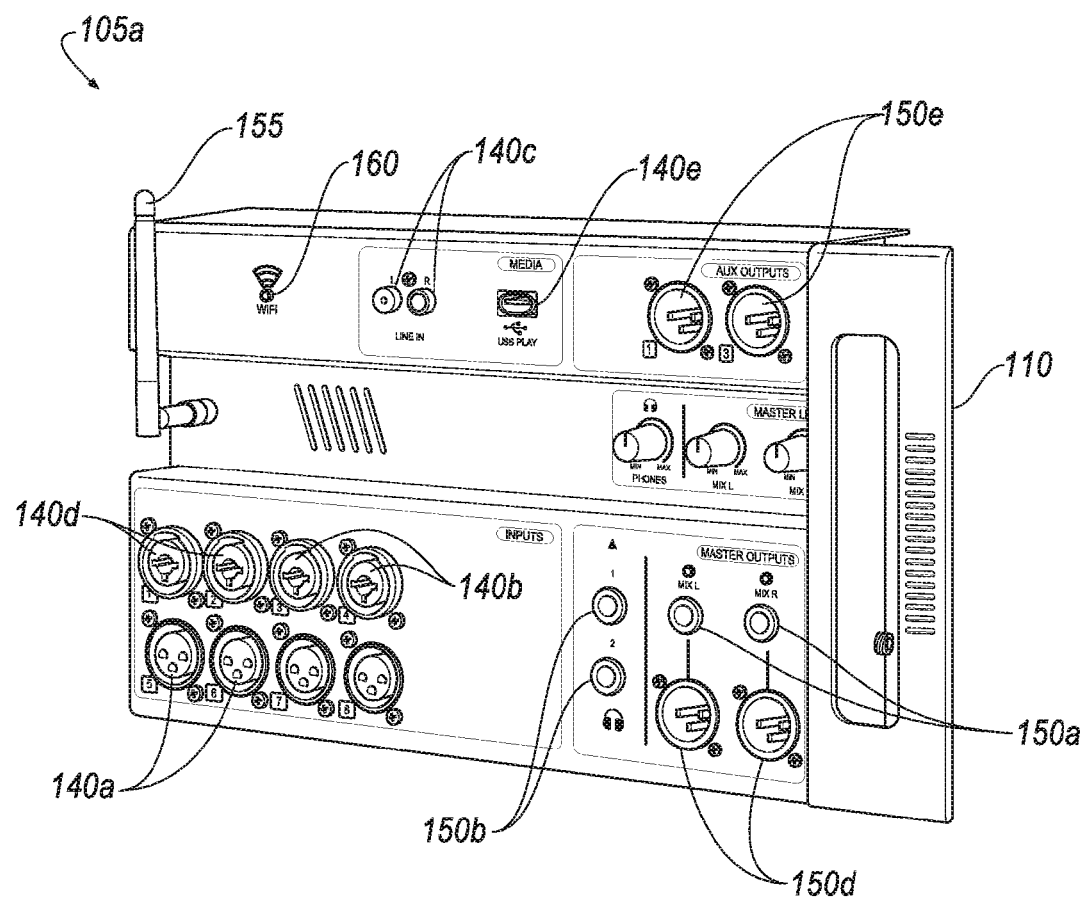
FIGS. 1A and 1B illustrate an example audio mixer in accordance with one embodiment.
Figure 1B:
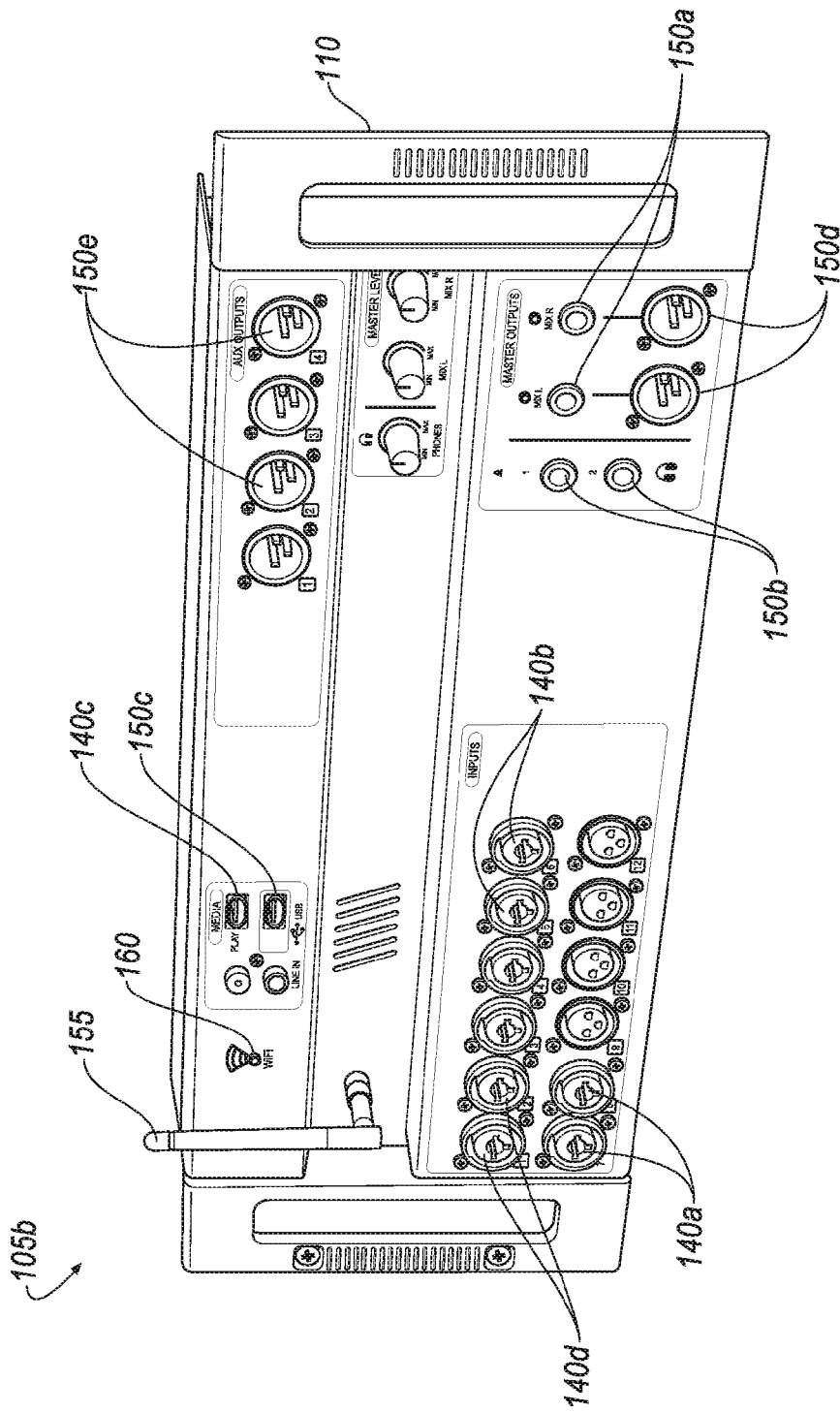

FIGS. 1A and 1B illustrate example audio mixers 105A and 105B, respectively, (collectively referred to herein as audio mixer 105) in accordance with one embodiment. The audio mixer 105 may have wireless communication capabilities, as described herein. The audio mixer 105 may include a plurality of input ports including XLR input ports 140A, combo input ports 140B, RCA input ports 140C, hi-z input ports 140D, a universal serial bus port (USB port) 140E, an Ethernet™ connection (not shown), collectively referred to herein as input ports 140. The audio mixer 105 may include various output ports including ¼" outputs 150A, headphone jacks 150B, High-Definition Multimedia Interface (HDMI) output (not shown), USB stereo recording 150C (as shown in FIG. 1B), and auxiliary and monitor sends 150D, collectively referred to herein as output ports 150. The audio mixer 105 may also include additional USB ports and a power source connection. The audio mixer 105 may also include a cascade connector (e.g., cat-5 connector) to facilitate the cascading of multiple audio mixers 105.

The audio mixer 105 may include an antenna 155 and a light emitting diode (LED) 160, which may be configured to illuminate to indicate a connection with a wireless network. Although not shown, the Ethernet™ connection, reset switch, footswitch, additional USB ports and HDMI output may be arranged on a side panel of the audio mixer 105.

FIG. 1A illustrates an audio mixer 105A having at least 12 input ports and FIG. 1B illustrates an audio mixer 105B having a least 16 input ports, although other configurations and the number of inputs and outputs may vary. The audio mixer 105 may be, for example, a Soundcraft Ui12™, Soundcraft Ui16™, etc.

The audio mixer 105 may include at least one handle 130 and may be configured to be portable and easily moved from one location to the next. The audio mixer 105 may also be a stagebox, or may be rack-mountable.

Figure 3:
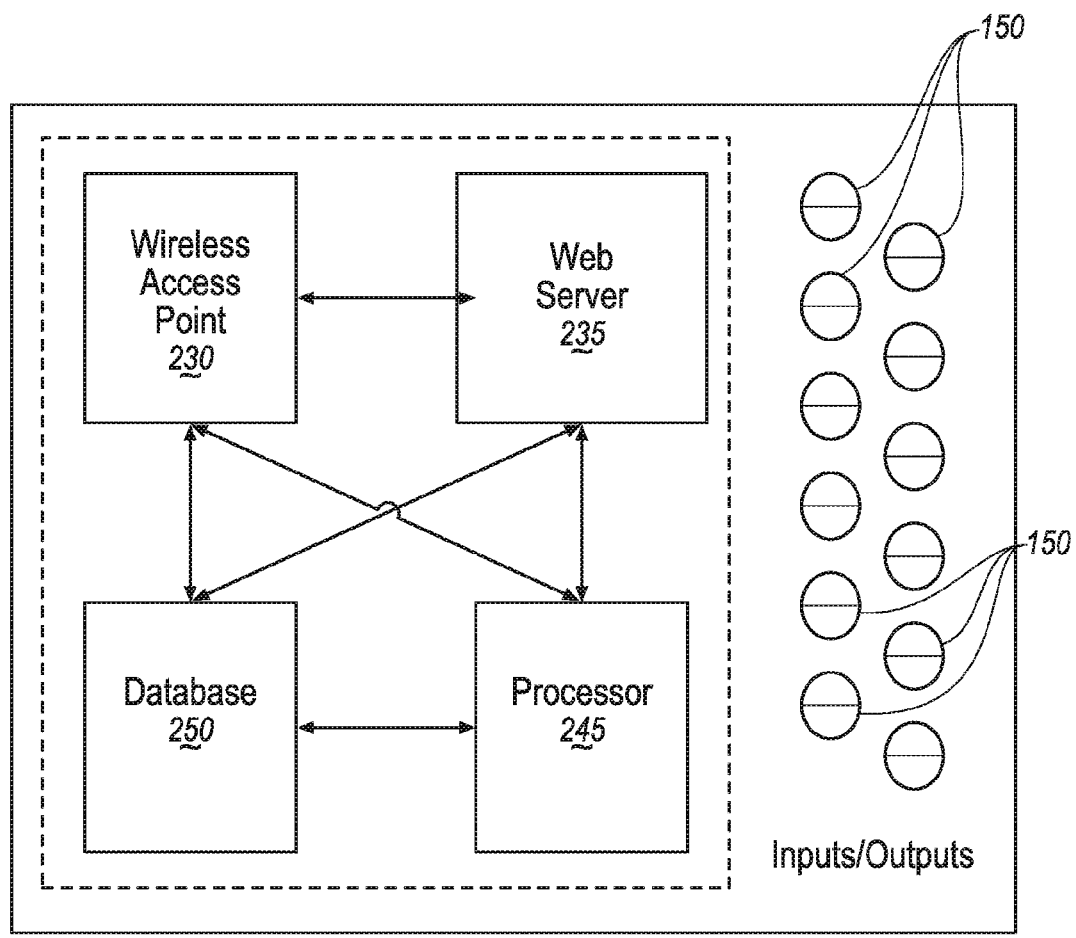
FIG. 3 illustrates an example mixer architecture in accordance with one embodiment.

As described in more detail with respect to FIG. 3, the audio mixer 105 may include a wireless access point, as shown as 230 in FIG. 3, (e.g., a BLUETOOTH module, a ZIGBEE transceiver, a Wi-Fi™ transceiver, an Infrared Data Association (IrDA) transceiver, a Radio Frequency Identifier (RFID) transceiver, etc.) configured to communicate with a compatible wireless transceiver of an external device. The mixer 105 may also communicate with external devices via a wired connection. Additionally or alternatively, the audio mixer 105 may also communicate with external devices via the Ethernet™ connection. In one example, the audio mixer 105 may communicate both via Ethernet™ and wireless networks simultaneously.

The audio mixer 105 may include certain digital signal processing (DSP) and effects such as Digitech® amplification modeling. The audio mixer 105 may also include Advanced Feedback Suppression® by Dbx® on all auxiliary outputs. Lexicon® processing may also be included in the audio mixer 105 including effects such as reverbs, delays and choruses. The audio mixer 105 may also include four-band parametric equalization, high-pass filter(s), compressor, de-esser, and noise gate on all inputs. The audio mixer 105 may include 31-band graphic equalization, noise gate, and compressor on all outputs (e.g., output ports 150). Additionally, a real-time frequency analyzer (RTA) may be included on all inputs and outputs (e.g., input ports 140 and output ports 150).

Figure 2:
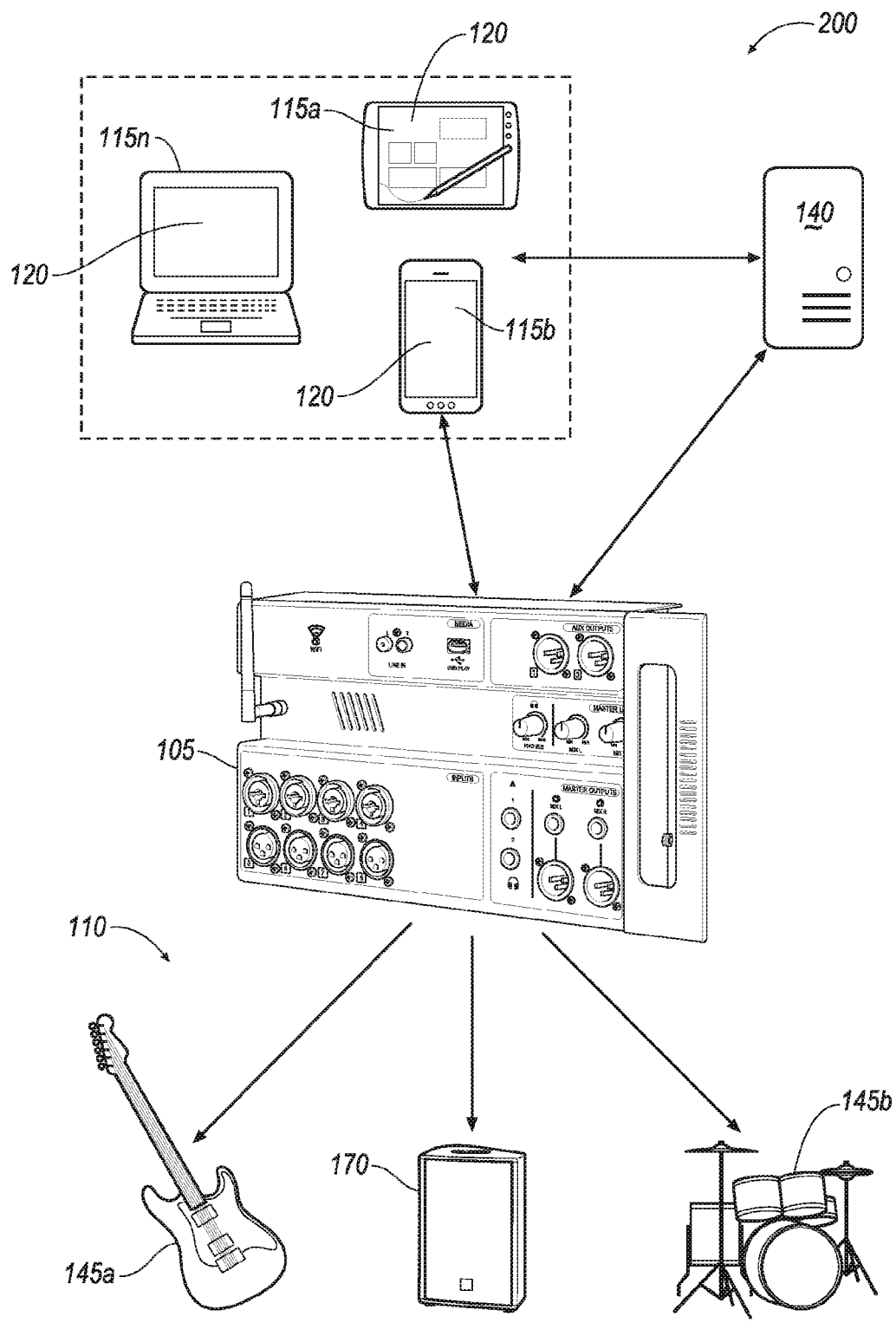
FIG. 2 illustrates an example mixing system in accordance with one embodiment.

FIG. 2 illustrates an example audio system 200 showing the audio mixer 105. The audio mixer 105 may communicate via wired or wireless connections with various musical devices 110 including instruments 145 (as shown by way of example in FIG. 2 as a guitar 145A and drum 145B) and output playback devices 170, such as speakers (collectively labeled devices 110). The devices 110 may include other instruments 145 such as keyboards, etc., as well as microphones. The audio mixer 105 may be remote from the mobile device 115.

The system 200 may also include any number of mobile devices 115a-115n ("115"). The mobile devices 115 may be any of various types of portable computing devices, such as cellular phones, tablet computers, smart watches, laptop computers, portable music players, or other devices, etc. Each mobile device 115 may include a wireless transceiver (e.g., a BLUETOOTH module, a ZIGBEE transceiver, a Wi-Fi transceiver, an IrDA transceiver, an RFID transceiver, etc.) configured to communicate with the audio mixer 105 and/or a remote server 135.

Each mobile device 115 may include a device display screen 120 configured to display information to a user and to receive commands from the user. The interfaces displayed via the display screen 120 may be any one of, or a combination of visual displays such as light emitting diodes (LEDs), organic LED (OLED), Active-Matrix Organic Light-Emitting Diode (AMOLED), liquid crystal displays (LCDs), thin film diode (TFD), cathode ray tube (CRT), plasma, a capacitive or resistive touchscreen, etc.

As shown in FIG. 2, each mobile device 115 is configured to communicate with the audio mixer 105.

Each mobile device 115 may be capable of accessing an HTML5 webpage (i.e., the device 115 may be HTML5 compatible). The mobile device 115 may communicate directly with the audio mixer 105 via a wireless network (not shown). Further, each mobile device 115 may be any device capable of handling HTTP regardless of the device's platform (i.e., any device including iOS®, Android®, Windows®, Mac® OS, Linux®, etc., platforms). The audio mixer 105, as explained, may be capable of wireless communication without the use an external router. Thus, additional hardware and set-up thereof is not necessary to enable wireless communication with the audio mixer 105.

The remote server 135 may be configured to maintain mixing properties and data including certain DSP, effects and mixer-specific data. Each remote server 135 may store and transmit updates (e.g., additional signal processing algorithms) to each mobile device 115 and/or the audio mixer 105.

As shown in FIG. 3, the audio mixer 105 may include a wireless access point 230 and a web server 235 configured to process requests via, by example, HTML, specifically HTML5. The wireless access point 230 may facilitate a connection to the wireless network. Thus, commands may be sent from the mobile device 115 directly to the audio mixer 105, without the need for an external router. The web server 235 may include Hyper Text Markup Language (HTML) 5 websockets to open an interactive communication session between the user's browser and a server. By using a websocket based application program interface (API), messages may be transmitted and received without having to poll an external server for a reply.

In use, once a user at the mobile device 115 opens a browser and enters the appropriate uniform resource identifier (URL), the user may enter his or her credentials (e.g., user name and password). The mobile device 115 uses such a user input to transmit a command over a socket connection to the web server 235 of the audio mixer 105. The socket connection facilitates communication between the mobile device 115 and the web server 225. Once this bidirectional communication is open, the audio mixer 105 may receive commands from the mobile device 115. Concurrently, the web server 235 may send feedback such as metering, synchronization information, etc., to the mobile device 115 and the user interface at the mobile device 115 may be updated accordingly.

The mixer 105 may communicate with up to ten mobile devices 115 at a time. When multiple mobile devices 115 are simultaneously transmitting commands to the mixer 105, each mobile device 115 may, in real-time or near real-time, display the effects of the commands sent by another mobile device 115. For example, if a first user at a first one of the mobile devices 115a adjusts the fader, a second user at a second one of the mobile devices 115b may then see the adjustments made by the first user at the second mobile device 115b. In addition to processing being recognized nearly simultaneously across multiple mobile devices 115, each mobile device 115 operates independent of the other. That is, for example, while a first user at the first mobile device 115a is controlling drum dynamics, the second user at the second mobile device 115b may be monitoring the gain across all of the in-use channels at the mixer 105.

As shown in FIG. 3, the audio mixer 105 may include a processor 245 and a database 250 configured to perform instructions, commands and other routines in support of the processes described herein. For example, the processor 245 may be configured to execute signal processing on various inputs to provide audio processing such as gain adjustments, feedback suppression, distortion, delays, etc., for each instrument 145 that provides an input to the audio mixer 105. The processor 245 may include a controller (not shown) and may include a dual-core processor (e.g., an ARM® processor) configured to interface with the web server 235 and perform other signal processing for extra effect processing on-board the audio mixer 105.

The database 250 may maintain certain presets for various instruments 145 and the playback device 170, as well as save previously applied settings to the instruments 145 and the playback device 170. These presets and settings may be user specific and the database 250 may maintain user profiles and settings associated therewith. Groups and sub-groups, including settings and securities therefore, may be maintained in the database 250. The database 250 may receive updates from the remote server 135 or the mobile device 115, including software updates, as well as updated user information (including user profile updates and settings).

The processor 245 and/or controller may interface with the inputs ports 140 and output ports 150 of the audio mixer 105 to achieve the desired processing. The processor 245 may also receive user input via controls on the audio mixer 105, such as adjustments to head phone volume and left and right master volume.

The mobile device 115 may access and communicate with the mixer 105 via an audio mixer identification such as an internet protocol (IP) address of the audio mixer 105. Once the mobile device 115 accesses the web server 235 via the websocket, various mixer settings, presets, etc., may be adjusted in the HTML5 interface. Certain settings may be saved and recalled for later use. Additionally, certain security settings may be included via username/password combinations that are enterable at the HTML5 interface. In these settings, specific access may be given to certain login combinations. For example, a first user, or administrator, may have access to adjust, change, save, etc., any and all settings for all of the instruments 145 and/or the playback device 170 that are operably connected to the audio mixer 105. In another example, a guitarist may only have access to the settings as they relate to his or her guitar.

Through a series of interfaces on the device display screen 120, users may control the mixer. These interfaces may be maintained via HTML5 and may be updated in real-time or near real-time based on feedback of the audio mixer 105, as well as user interaction at other mobile devices 115.

FIGS. 4A-4M illustrate example screens 400A-400M for the user interface to be displayed via the web browser on the mobile device 115. The interfaces include various mixing features configured to control the audio mixer 105 in response to user inputs at the display screen 120 of the mobile device 115. The audio mixer 105 includes functions such as subgroups, mute groups and view groups. The audio mixer 105 also includes a snapshot recall system configured to create and store the specific mix for a show, or individual songs. Shortcuts to various features and settings may be including throughout the interface to increase usability and provide a better user experience. The various interfaces may facilitate certain navigation and user gesture techniques to create a user-friendly interface system.

Figure 4A:
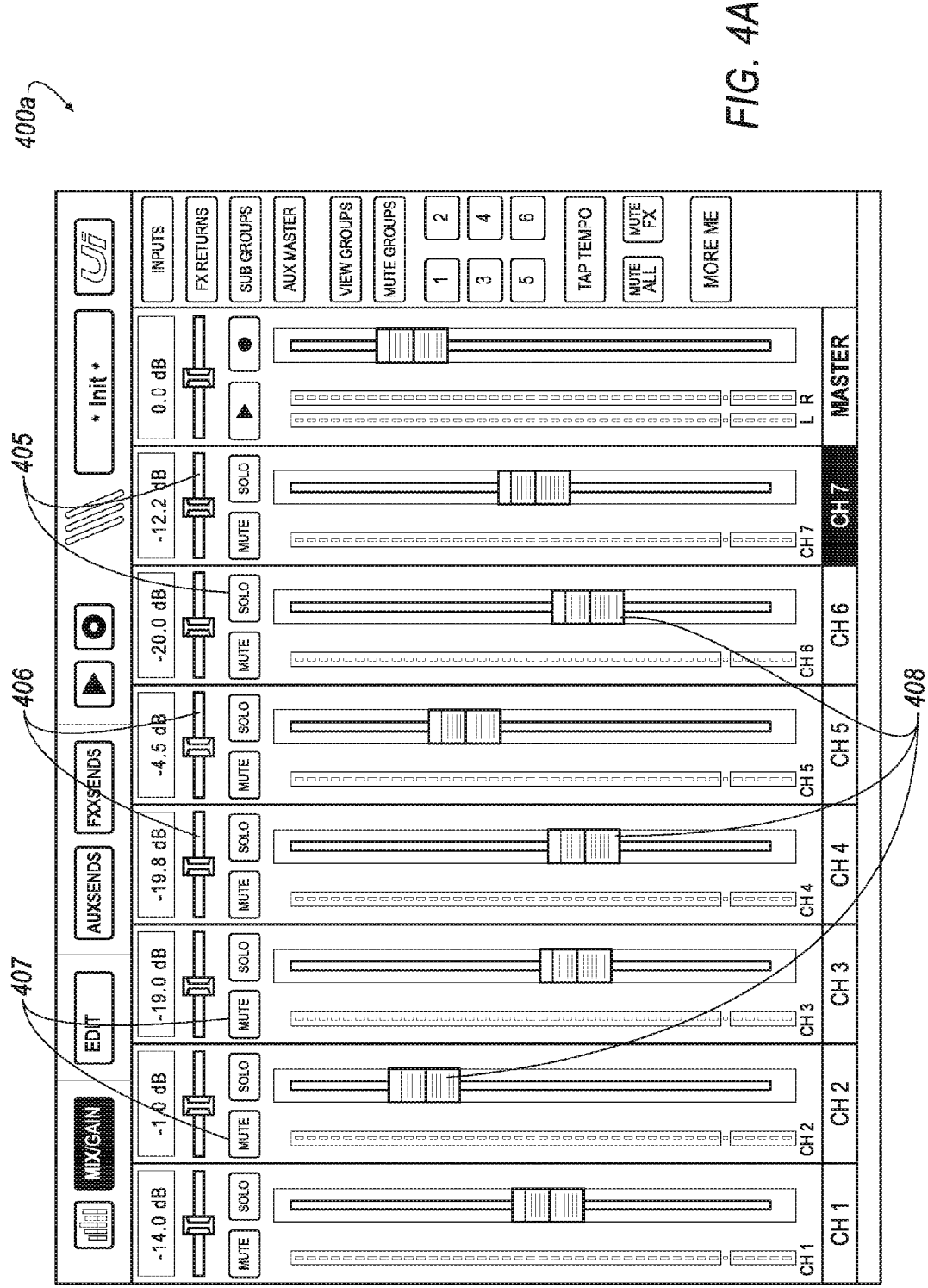
FIGS. 4A-4M illustrate example screens for the mixing system in accordance with one embodiment.

FIG. 4A illustrates a mix screen 400A where the user may create and monitor mixes for fellow musicians or adjust current mixes, in accordance with one embodiment. Each channel (e.g., CH1, CH2, CH3, CH4, CH5, CH6, CH7, etc.) may have a corresponding long-length fader 408 for finite adjustment of mix levels. Each channel may also include a mute button 407, a solo button 405, and a panning control 406. This interface may permit quick navigation to inputs, FX returns, subgroups, and aux masters. Quick access to the meters screen 400L (FIG. 4L), gain screen 400B (FIG. 4B), edit screen or equalization (EQ) screen 400E (FIG. 4E), aux sends screen 400C (FIG. 4C), FX sends screen 400J (FIG. 4J), USB playback screen 400K (FIG. 4K), and show/snapshot control may be available via this interface. A mute all inputs feature may also be presented. Pre-fade listen (PFL) and after-fade listen (AFL) metering levels are presented for the inputs.

The mix screen 400A may be a scrolling screen whereby a user may scroll laterally across the screen to view each channel fader 408. The channels will correspond with the inputs and outputs on the audio mixer 105. The user may view and control each channel via the mix screen 400A. The mix screen 400A may present other buttons and selectable options.

Figure 4B:
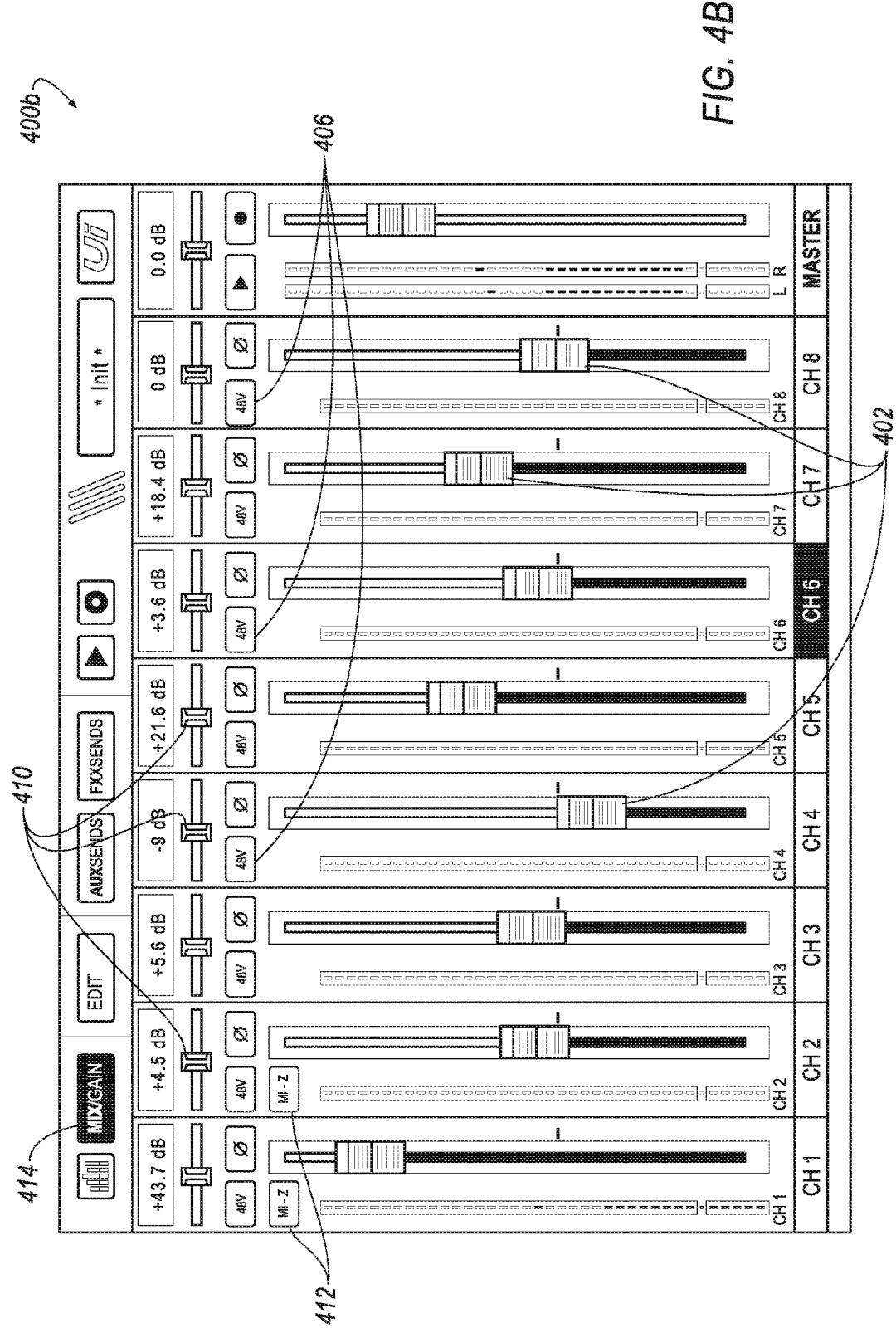

FIG. 4B illustrates a gain screen 400B which also includes the long-length faders 408, as well as a 48V option 406 and panning control 410, among other controls, per channel. Hi-z inputs 412 are presented for the first two channels (e.g., CH1 and CH2), and PFL and AFL metering levels are presented. The mix screen 400A and gain screen 400B may be presented by selecting a mix/gain button 414.

Figure 4C:
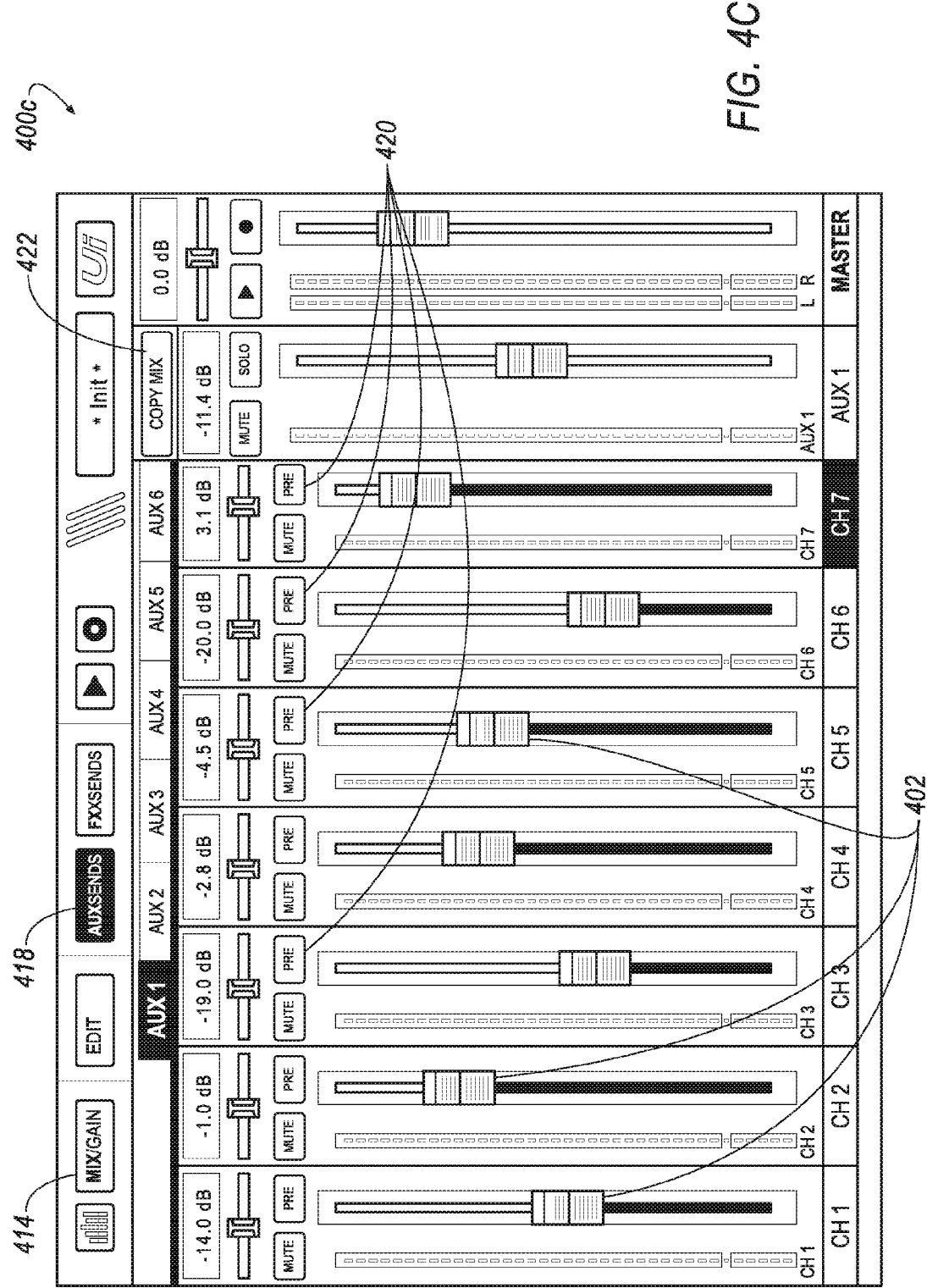

FIG. 4C illustrates an aux sends screen 400C which allows the user to create auxiliary mixes allowing the user to send secondary feed of an input channel's audio signal to another destination, independent of the channel's main output. The screen 400C may be presented by selecting the auxsends button 418 and includes the long-length faders 408 for 2 auxiliaries, with 2 additional auxiliaries being available via the headphone output (e.g., headphone jacks 150B). The user may determine the level of signal to be sent to the selected auxiliary bus. Pre/post buttons 420 per channel or global pre/post adjustments are also presented via the screen 400C. Features such as copy mix 422 is available for duplicating the main mix.

Figure 4D:
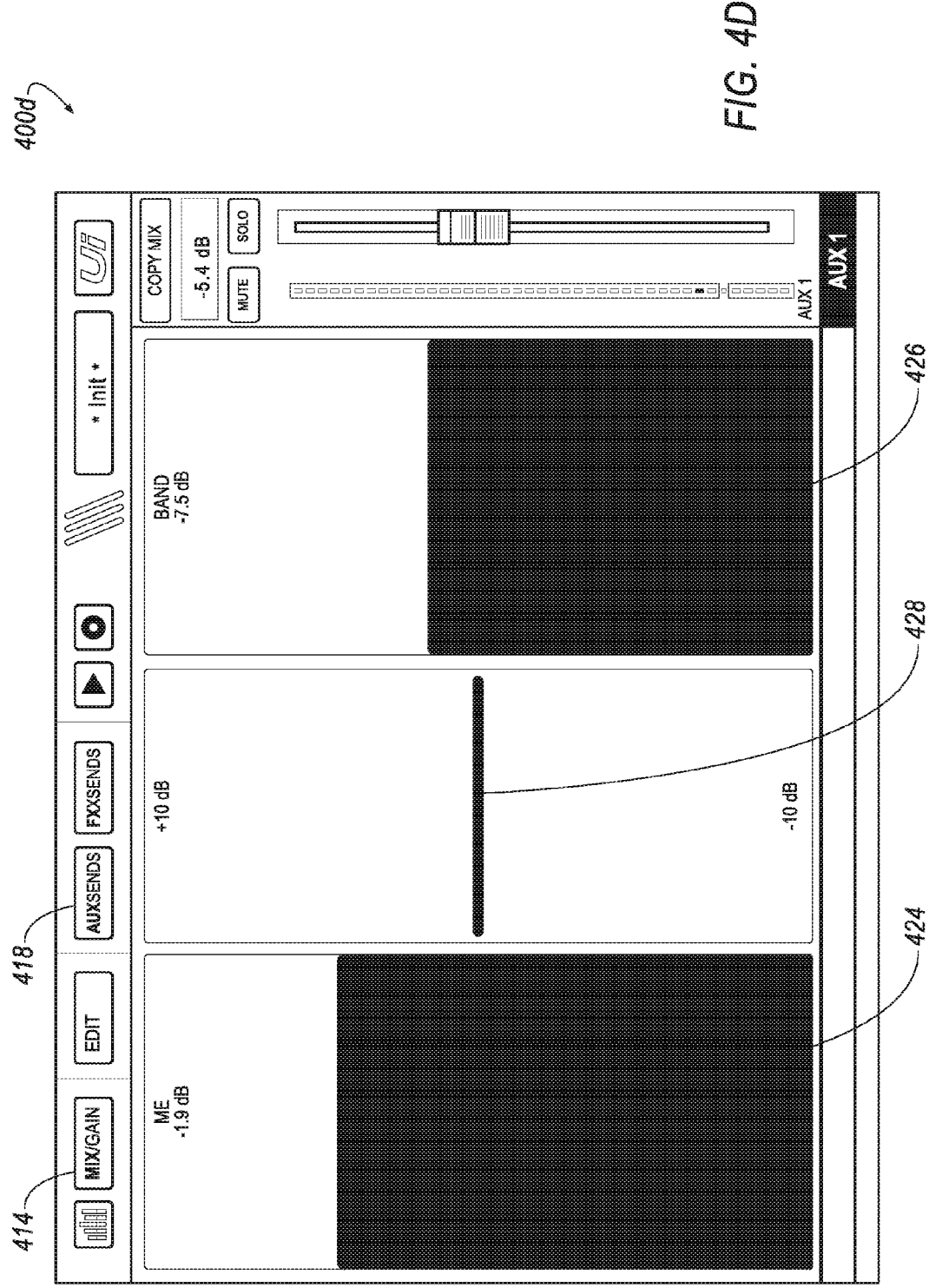

FIG. 4D illustrates a MoreMe screen 400D which is designed for users who wish to control their own monitor mix and allows a user to adjust their level of gain for their instrument 145 with respect to all other instruments 145 (e.g., the rest of the band). The MoreMe screen 400D facilitates control of the individual 424 (i.e., "Me"), the "Band" 426 individually, and/or with the use of the center control 428 to adjust the balance.

Figure 4E:
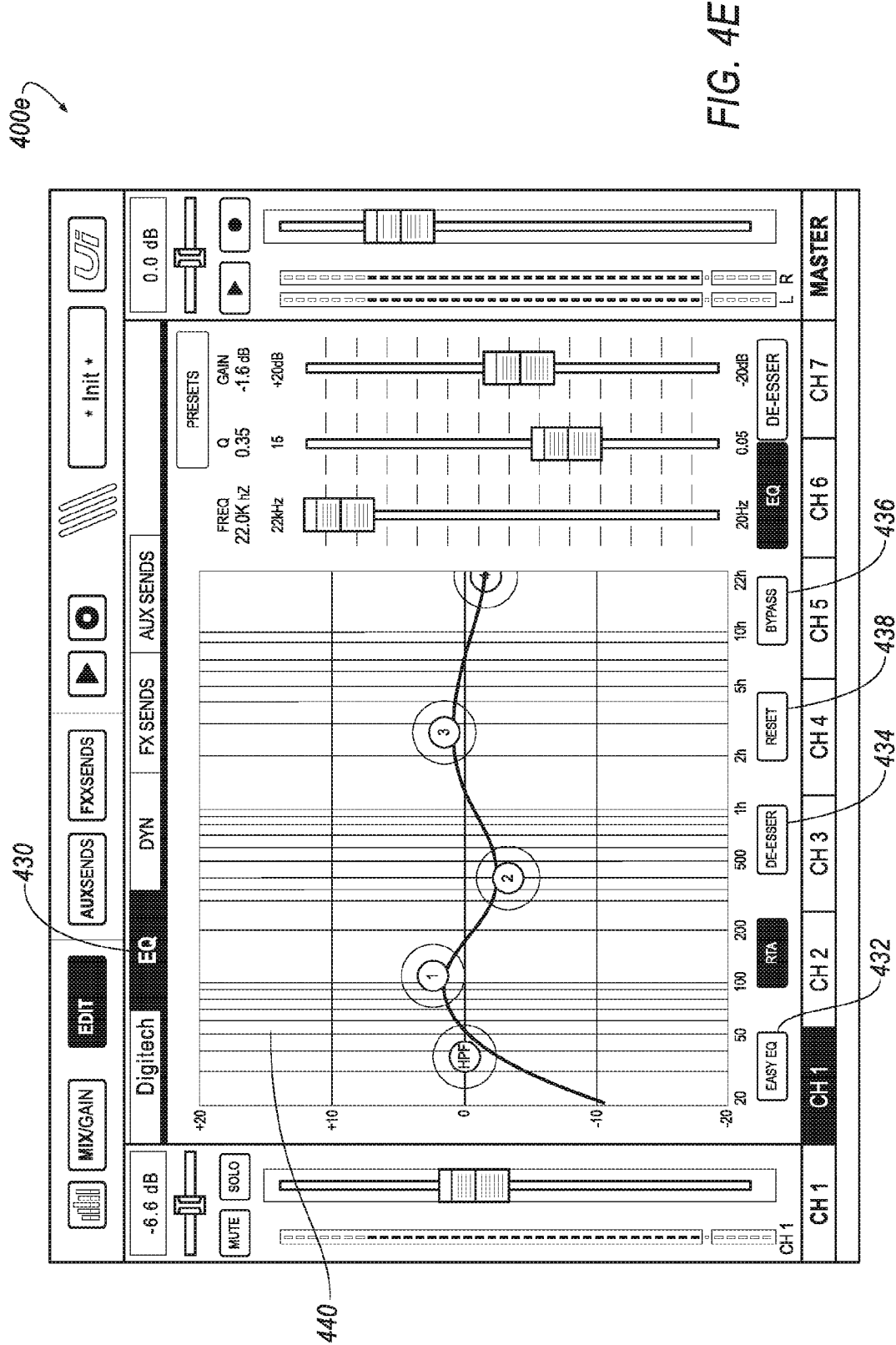

FIG. 4E illustrates an equalization in ("EQ") screen 400E which is one of the edit screens. Each channel (e.g., CH1-CH7) includes a RTA with 120 frequency points. The EQ screen 400E may be accessed by the user double tapping or double clicking on a certain fader 408 in the mix screen 400A of FIG. 4A. The EQ screen 400E, as well as the dynamic FX sends and aux sends screens, may also be accessed by double tapping or double clicking the channel (e.g., CH1-CH7) in the mix screen 400A of FIG. 4A. Similarly, double tapping anywhere on the EQ screen 400E may return the interface to the mix screen so that another channel may be selected.

The EQ control tab 430 facilitates 4-band fully parametric EQ with Frequency Q, and Gain per band on every input channel. The screen presents an Easy EQ button 432 for simplified controls, as well as a de-esser button 434, a by-pass button 436, and an EQ reset 438 to clear EQ settings. The screen 400E presents an EQ graph 440 illustrating data points for each EQ band, high pass filter (HPF), and de-esser. By selecting a certain channel (e.g., touching the respective number on the graph), the user may adjust the frequency, gain and Q-factor. This screen facilitates easy adjustment of the EQ settings with real-time feedback. The de-esser button may apply a de-esser on all input channels.

Figure 4F:
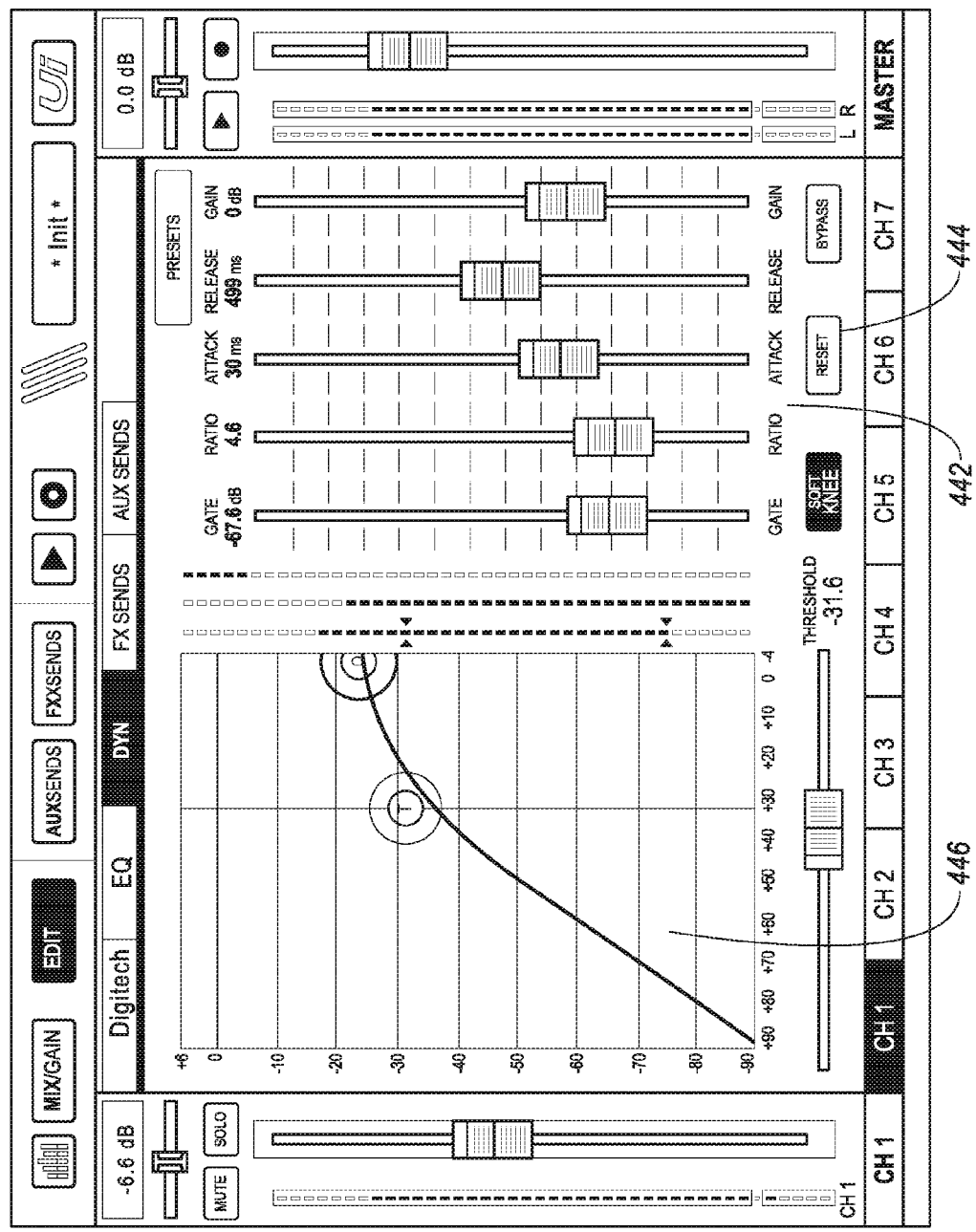

FIG. 4F illustrates a dynamics screen 400F showing Dbx® compression, de-essing and noise gate processing on the input channel. Gate, ratio, attach, release and gain controls are presented for the selected channel. Noise gate controls 442 with optimized time constants are presented, as well as pre-dynamics, post dynamics and grain reduction meters. A reset button 444 is presented to clear the dynamic settings. A dynamic graph 446 illustrates selectable points for both threshold and ratio.

Figure 4G:
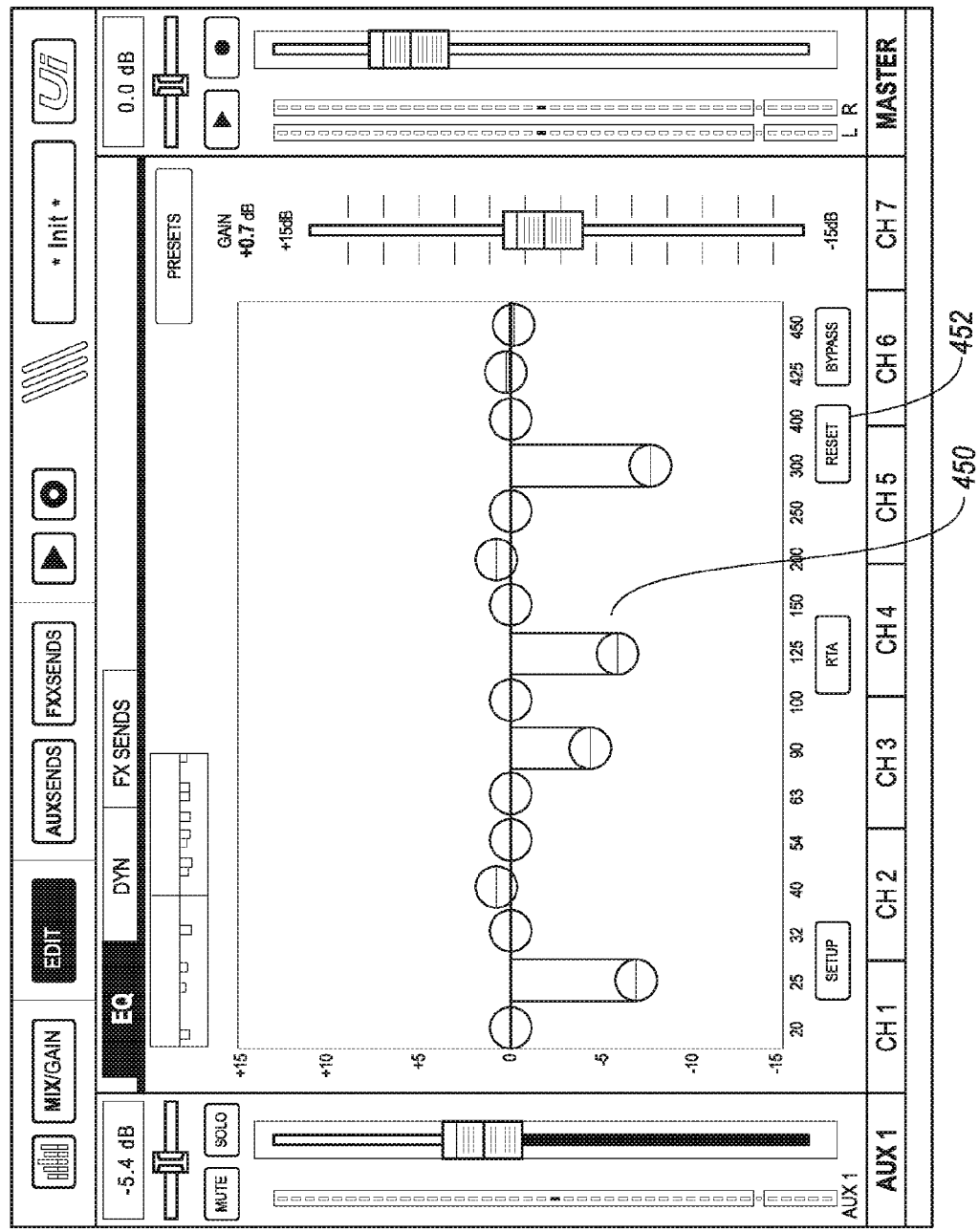

FIG. 4G illustrates a 31-band Dbx® feedback suppression screen 400G allowing maximum gain before feedback on all auxiliary inputs. Thus, feedback is kept to a minimum even in extreme monitoring environments. The screen 400G shows 31 selectable frequency points 450 for gain equalization (GEQ) control. A reset button 452 is presented to clear the GEQ settings. A 120-band RTA is available for any input/output to illustrate how the EQ is affecting the signal in real-time or near real-time.

Figure 4H:
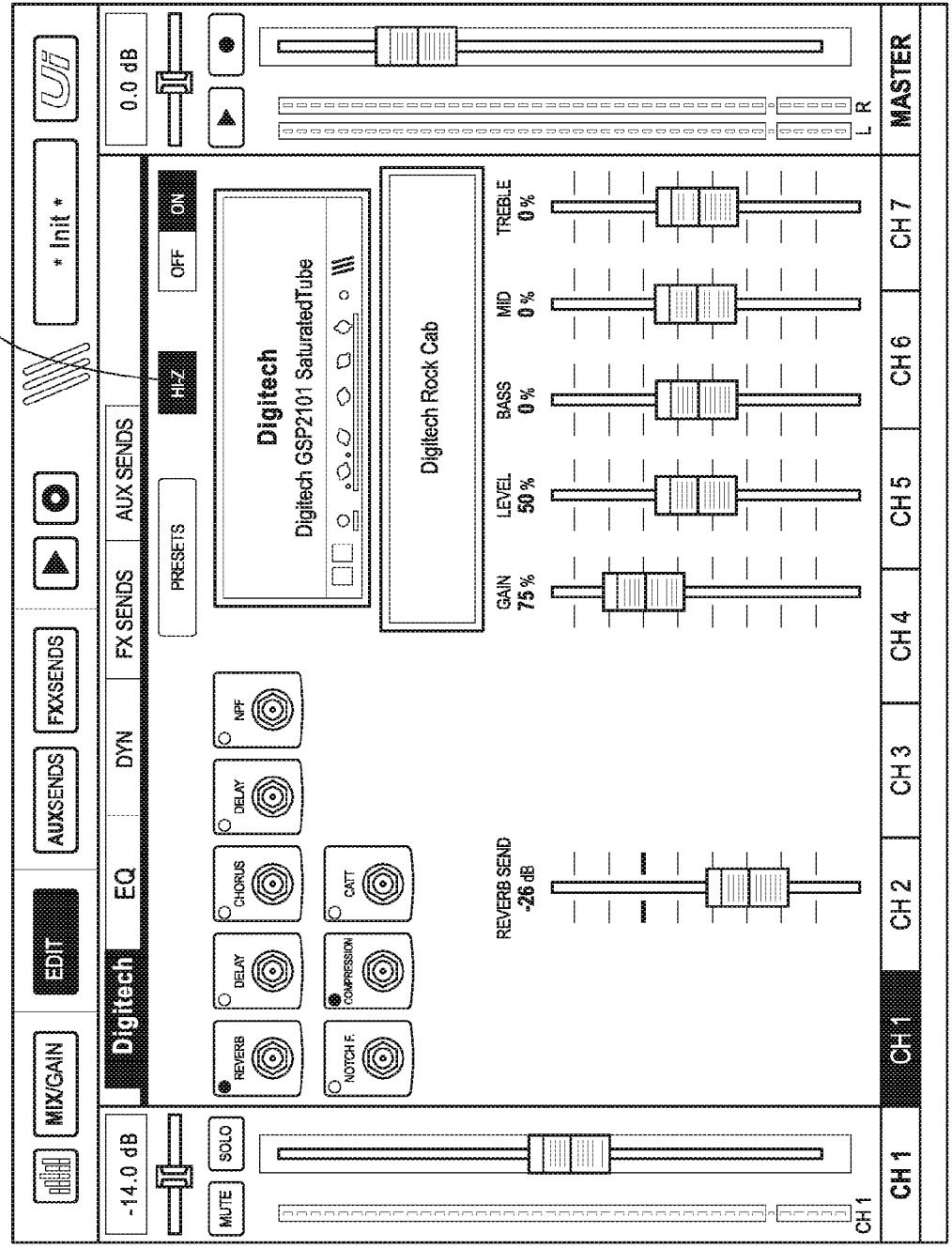

FIG. 4H illustrates a Digitech® AMP and Stompbox modeling screen 400H providing hundreds of amplifier and effect combinations to satisfy user requirements. The screen 400H presents a channel view for the first two channels as well as a selectable Hi-z selection 454 for sources such as direct-input guitar pickups. The screen 400H also allows single-view editing of selected channel features via the Footswitch/Stompbox buttons.

Figure 4I:
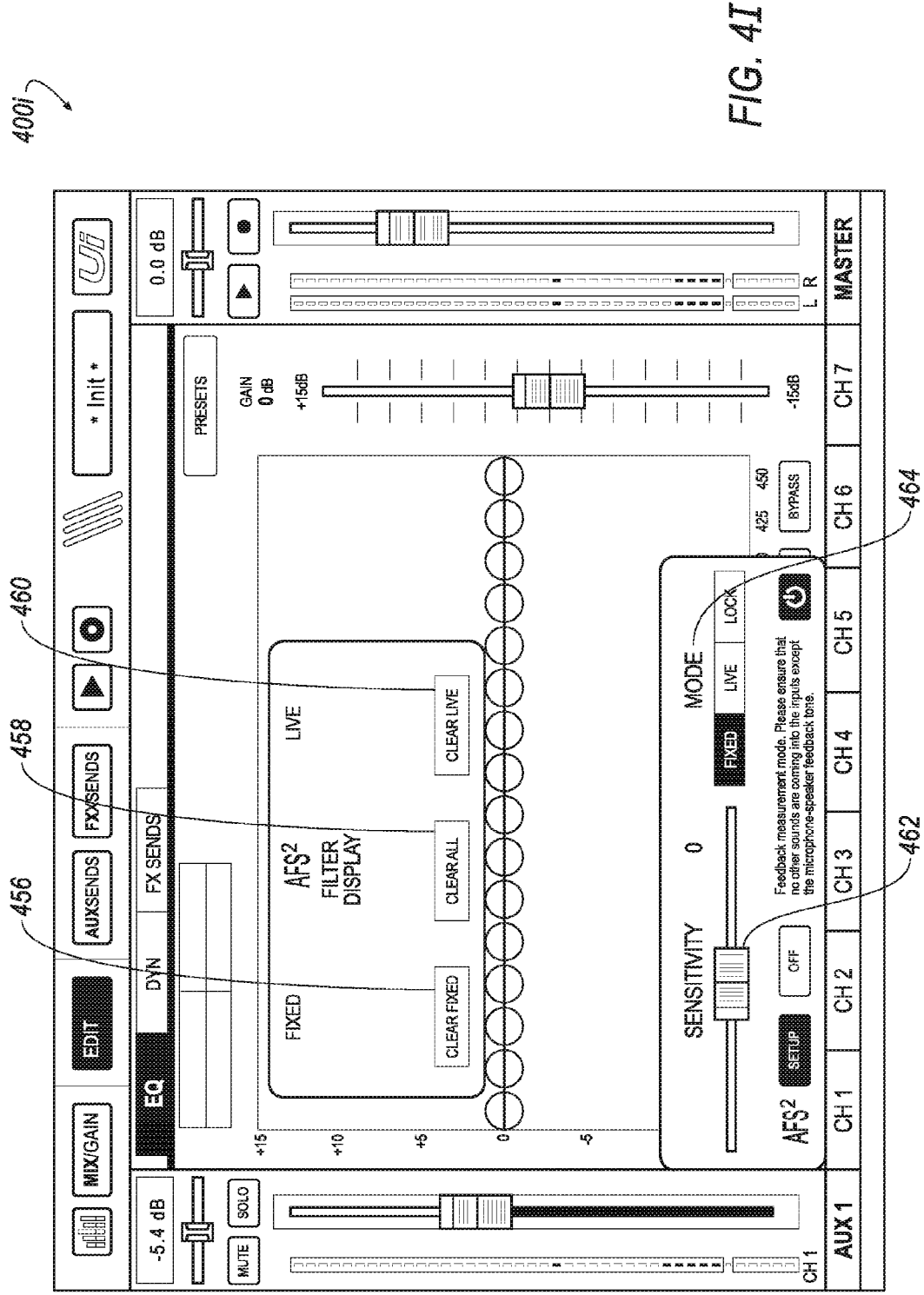

FIG. 4I illustrates an automatic feedback suppression (AFS) screen 400I. This screen 400 I illustrates various selectable buttons and options for the AFS features including a clear fixed button 456, a clear all button 458, and a clear live button 460. A sensitivity fader 462 may be presented, as well as a selectable mode feature 464. The system 200 may use twelve filters, including six fixed filters and six live filters that react in real-time or near real-time to suppress feedback.

Figure 4J:
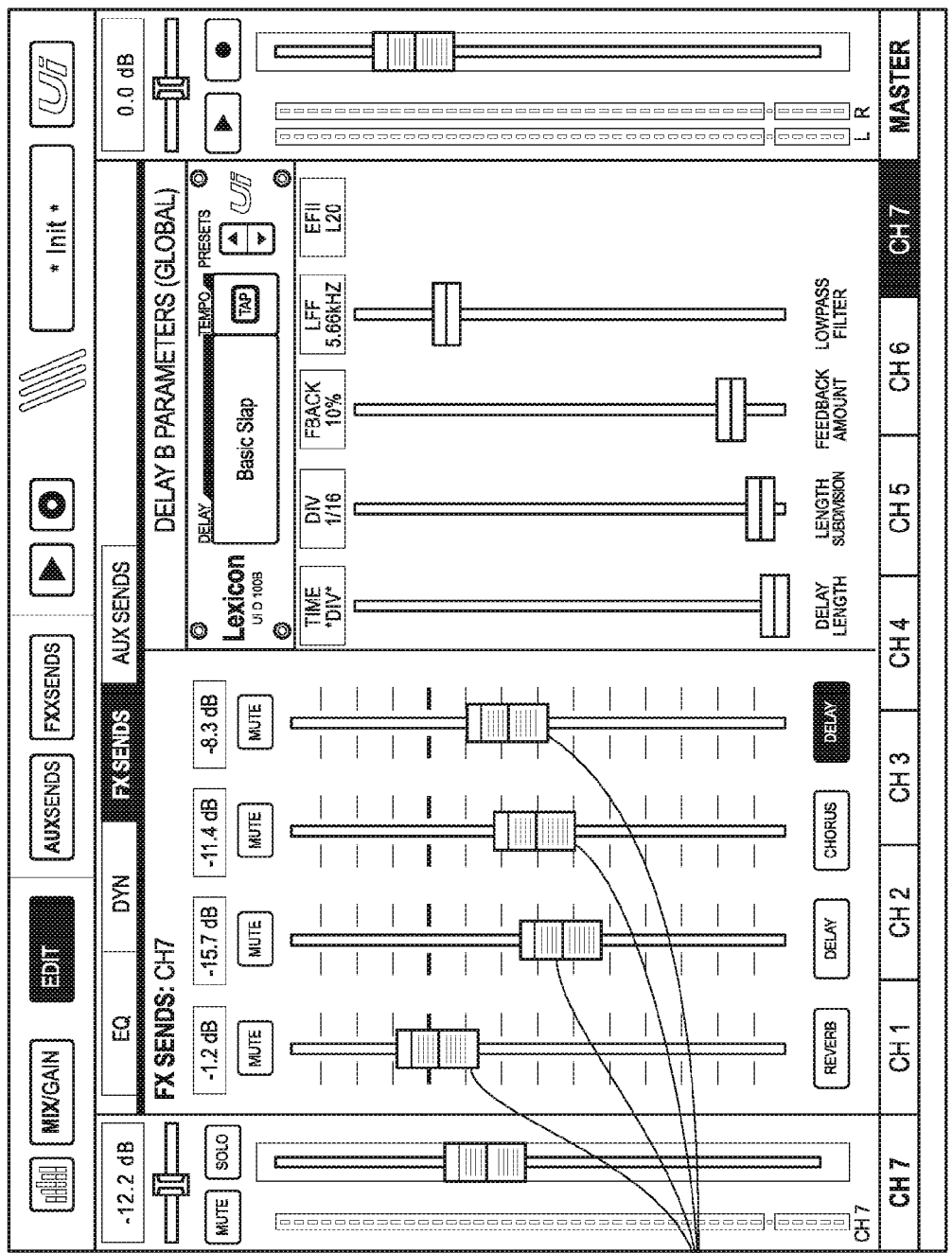

FIG. 4J illustrates an FX sends screen 400J with three dedicated FX buses feeding the Lexicon® effects processors. This screen 400J may present tap tempo control to synchronize delays and other effects. Reverb, delay, chorus and delay faders 466 may be presented. This screen 400J allows the user to determine which mix is sent to the selected FX processor.

Figure 4K:
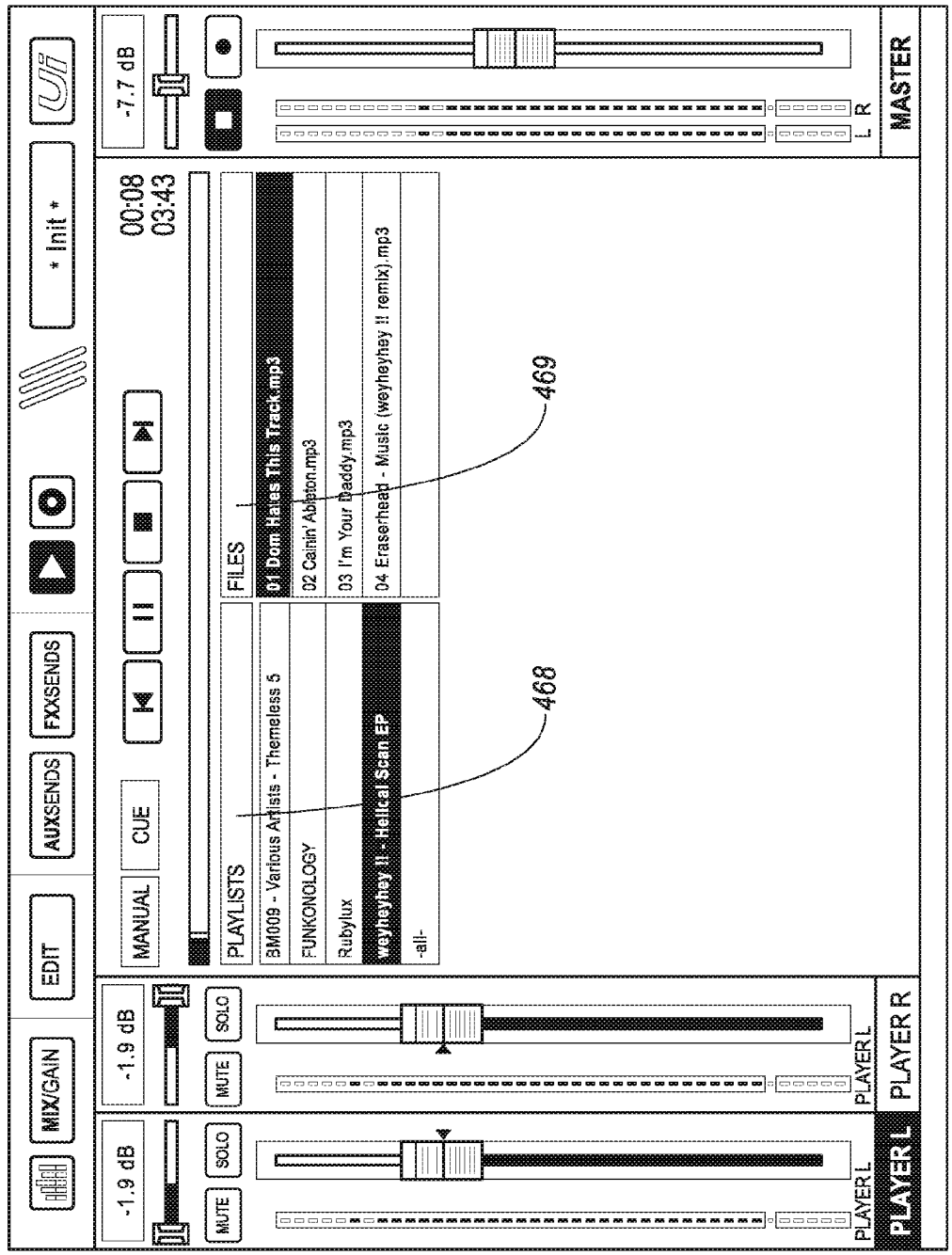

FIG. 4K illustrates a USB playback screen 400K where users may play audio content (e.g., music) directly from USB memory devices. The screen 400K facilitates organization of music into folders, cue control, automatic or manual playback modes, etc. Files may be played from a playlist 468 or directly from the file list 469.

Figure 4L:
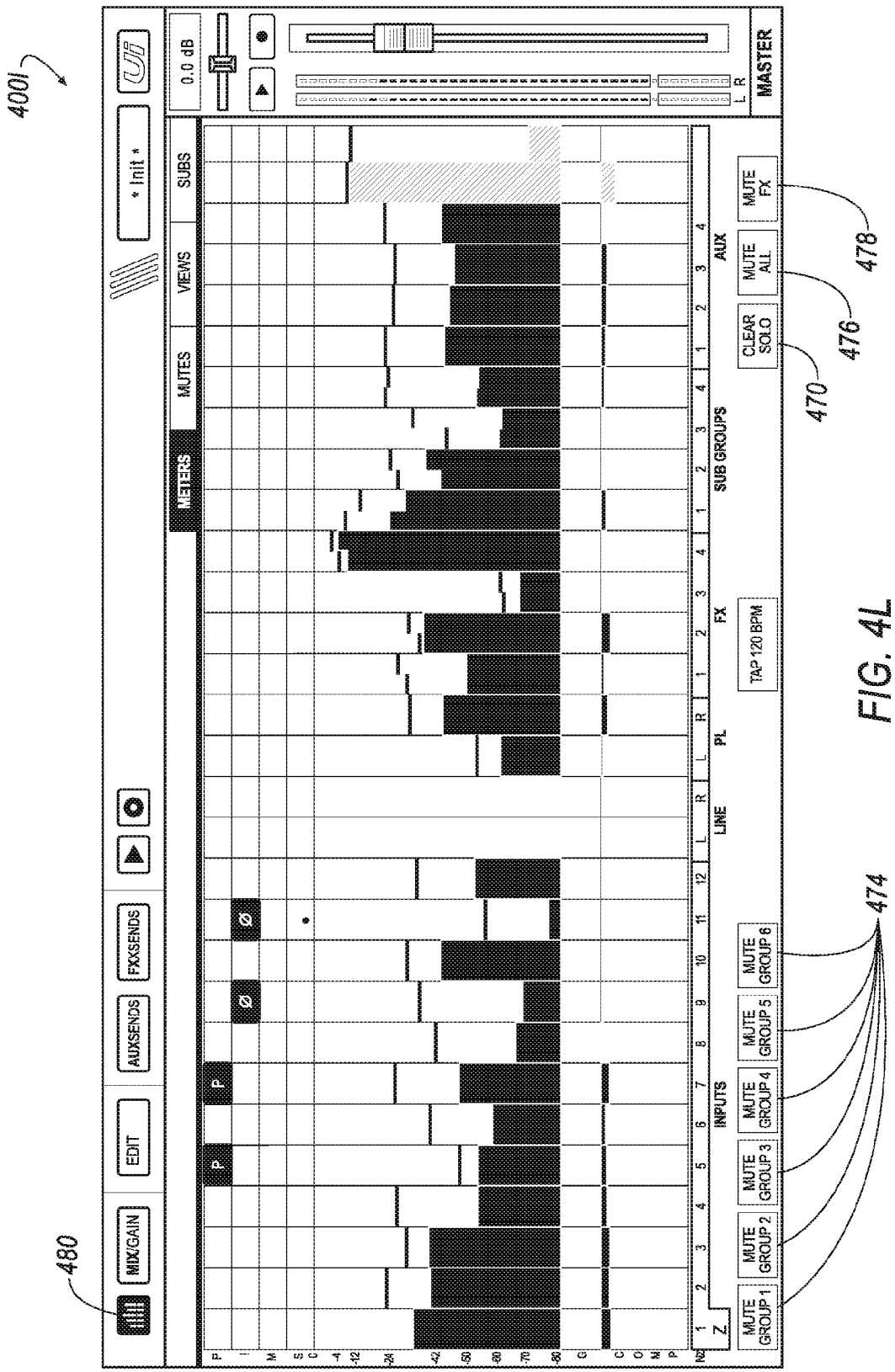

FIG. 4L illustrates a meters screen 400L illustrating volume-unit (VU) meters and gain reduction meters for all channels. This screen 400L also provides gate status indicators, as well as fast access to the clear solos 470, mute FX 472, mute groups 474 and mute all buttons 476.

The meters screen 400L may be accessible by double tapping or double clicking a channel meter, or by selecting a meter icon 480. The meters screen 400L concurrently displays the input and output metering, which reduces the meter footprint in the interface, thus avoiding the need for the user to navigate between two or more screens to view the inputs and outputs. The various mute group buttons 474 may be presented to mute certain groups.

Figure 4M:
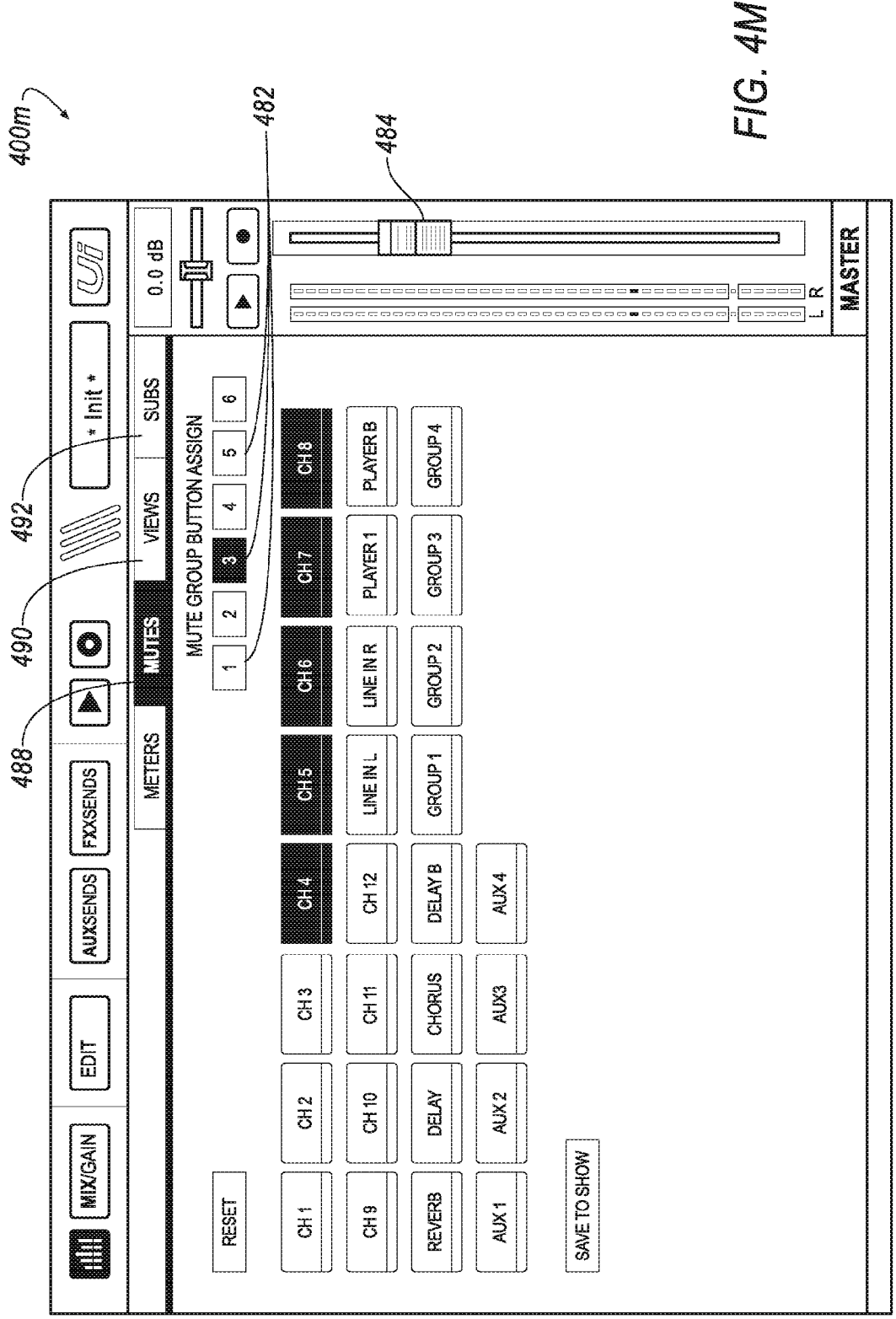

FIG. 4M illustrates a group screen 400M. Upon selecting the mutes tab 488, the screen 400 M may present six mute groups 482 for easy grouping of channel muting. Upon selecting the views tab 490 six view groups may be presented allowing the user to create custom view of the audio mixer channels. Upon selecting the subs tab 492, four subgroups may be presented to allow grouping of channels for an extra layer of processing and control of the subgroup channels with a single fader 484.

Because the audio mixer 105 may be controlled from any number of devices, the audio mixer 105 may continually send updated data back to the mobile devices 115. As a user navigates through the interfaces on the mobile device 115 to apply his or her settings, the screens 400A-400M will be updated in real-time or near real-time. Upon receiving user input that is indicative of a setting change, a command may be transmitted via the wireless communication between the mobile device 115 and the audio mixer 105 indicating the setting change. The audio mixer 105, upon receiving the command, may apply the setting change and transmit the updated data back to the mobile device 115 so that the corresponding screens 400A-400M reflect the change. The updated data is also transmitted to any other mobile device 115 currently communicating with the audio mixer 105.

Many traditional app-based audio mixer controls may use transmission control protocol (TCP) socket streams to achieve bidirectional communication with the mixer. However, these mechanisms are not well suited to provide real-time or near real-time feedback due to the overhead and latency often realized in these applications.

Figures 5, 6:
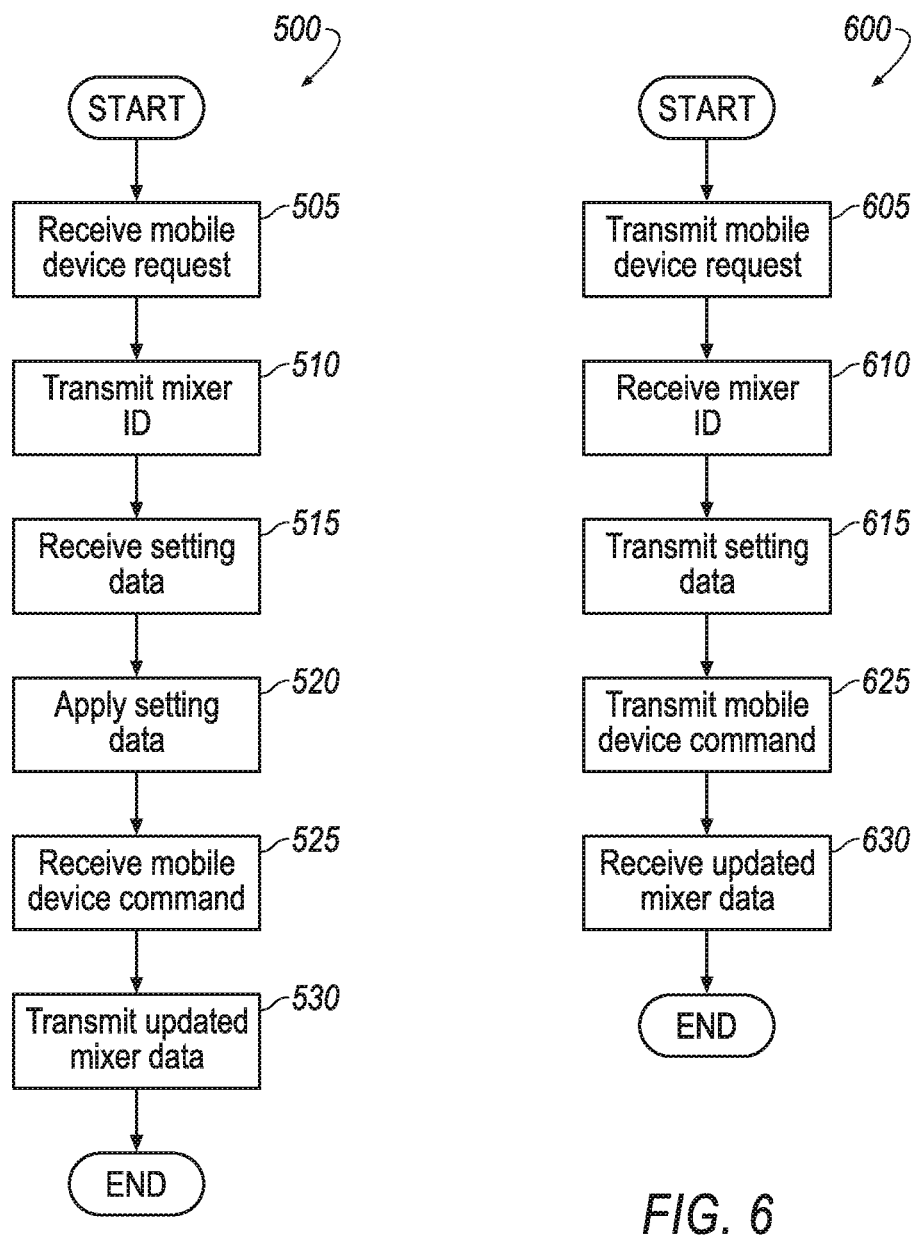
FIG. 5 illustrates an example process for the audio mixer.
FIG. 6 illustrates an example process for the mobile device.

FIG. 5 illustrates an example process 500 of the audio mixer 105 for applying and transmitting various mixer settings. The process 500 begins at block 505 where the audio mixer 105 may receive a mobile device request. The mobile device 115 may transmit the mobile device request in response to a user logging-in to the system 200 at the mobile device's browser.

At block 510, the audio mixer 105 may transmit a mixer ID to the mobile device 115. The mixer ID may be the IP address specific to the audio mixer 105. The mixer ID may also be a unique identifier such as a numeric representation, or other form of identifier used to differentiate the audio mixer 105 from other wirelessly capable devices.

At block 515, the audio mixer 105 may receive a mobile device command from the mobile device 115. The mobile device command may include a mixer setting. The mixer setting may be any of the settings described above with respect to FIGS. 4A-4M. For example, the mixer setting may include a gain on a certain mixer channel (e.g., CH1-CH7), a mute, a compressor threshold, etc. The mixer setting may be established by the user at the mobile device 115 via one of the interfaces thereon. The mobile device command may be received from any number of mobile devices 115 communicating with the audio mixer 105. For example, the mobile device command may transmitted by a laptop and another command may be transmitted by a mobile phone.

At block 520, the audio mixer 105 may apply the mixer setting indicated in the mobile device command. This may include adjusting the game on a specific channel, adjusting one of the auxiliary outputs, etc.

At block 525, the audio mixer 105 may transmit updated mixer data to the mobile device 115. The updated mixer data may include audio settings indicative of the current state of the audio mixer inputs and outputs. The updated mixer data may include updated channel data for the channel most recently adjusted via the mobile device command. The updated mixer data may also include other audio mixer data to indicate the current state of each active and/or inactive channels. Thus, each time a setting is adjusted at the mobile device 115, updated mixer data is transmitted back to the mobile device 115 so that the interfaces thereon reflect the current state of the audio mixer 105. That is, the display screen 120 may be continually updated. Furthermore, regardless of which mobile device 115 transmitted the mobile device command, each mobile device 115 in communication with the audio mixer 105 may receive the updated mixer data and therefore be configured to display the most up to date interfaces.

The process 500 may proceed until the audio mixer 105 is powered down, or until each of the mobile devices 115 is no longer communicating with the audio mixer 105.

FIG. 6 illustrates an example process 600 of the mobile device 115 for transmitting various mobile device commands and displaying in real-time or near real-time the state of the audio mixer. The process 600 begins at block 605 where the mobile device 115 may receive user input at the interface thereof. The user input may include opening a web browser on the device and entering user credentials such as a user-name and password.

At block 610, one the user is authenticated via the remote server 135 or web server 235, the mobile device 115 may transmit, via a wireless network, a mobile device request to the audio mixer 105. The mobile device request may include a request to pair or create a connection with the audio mixer 105.

At block 615, in response to the mobile device request, the mobile device 115 may receive the mixer ID.

At block 620, the mobile device 115 may receive the mixer data.

At block 625, the mobile device 115, in response to user input, may transmit a mobile device command.

At block 630, the mobile device 115 may receive updated mixer data from the audio mixer 105. As explained, the updated mixer data may include the current state of the audio mixer 105, which may be affected by the mobile device command. The mobile device command may be transmitted by any number of the mobile devices in communication with the audio mixer 105. Thus, the updated mixer data may include all settings, regardless of which mobile device is responsible for the change, providing for an integrated, real-time system controllable by multiple devices.

The process 600 may proceed until the audio mixer 105 is powered down, or until each of the mobile devices 115 is no longer communicating with the audio mixer 105.

Accordingly, the audio mixer is a complete digital mixing system that is compact and portable with the ability to be controlled by any connected device via a standard web browser without the need for device specific applications, and without operating system limitations, or constrains on how or where mixing occurs. The audio mixer is simple and secure, allowing the user to easily mix from anywhere in the venue and increase sound quality using dedicating processing from Dbx®, Lexicon® and Digitech®. The web-based mobile device controlled system may allow users to control the audio mixer and its settings remotely over a wireless network.

Computing devices, such as the audio mixer, remote device, external server, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium tangibly embodying computer-executable instructions of a software program, the software program being executable by a processor of a computing device to provide operations, comprising:

presenting, via a web browser on a mobile device, a display screen to receive user input to control a remote audio mixer that is operably coupled to and configured to control playback of at least one musical instrument;

transmitting, via a wireless network, a mobile device command indicating an audio setting applicable to the at least one instrument, the mobile device command being generated in response to user input at the display screen of the mobile device;

receiving, via the wireless network and in response to the mobile device command, first mixer data indicative of audio settings of the remote audio mixer; and presenting an updated display screen on the mobile device, the updated display screen reflecting the first mixer data as a result of the mobile device command to present a real-time display of the audio settings of the remote audio mixer.

2. The medium of claim 1, further comprising: receiving, via the wireless network, second mixer data indicative of audio settings of the remote audio mixer, wherein the second mixer data includes a second audio setting set by a second mobile device.

3. The medium of claim 2, wherein the updated display screen includes a plurality of faders each corresponding to an audio mixer channel.

4. The medium of claim 3, wherein the user input includes a selection of one of the plurality of faders.

5. The medium of claim 4, further comprising presenting at least one equalization screen specific to the audio mixer channel corresponding to a selected fader.

6. The medium of claim 1, wherein the updated display screen includes a graph corresponding to an audio mixer channel.

7. The medium of claim 6, wherein the audio mixer channel includes at least one input channel and at least one output channel.

8. The medium of claim 6, wherein the graph is updated in real-time based on the first mixer data.

9. An audio mixing system for providing an audio processing interface at a mobile device, comprising:

a mobile device including an interface configured to:

present a display screen to receive user input to control a remote audio mixer that is operably coupled to and configured to control playback of at least one musical instrument;

transmit, via a wireless network, a mobile device command indicating an audio setting applicable to audio playback of the at least one musical instrument, the command being generated in response to user input;

receive, via the wireless network and in response to the mobile device command, first mixer data indicative of audio settings of the remote audio mixer; and present an updated display screen, the updated display screen reflecting the first mixer data as a result of the mobile device command to present a real-time display of the audio settings of the remote audio mixer.

10. The audio mixing system of claim 9, wherein the mobile device is further configured to receive, via the wireless network, second mixer data indicative of audio settings of the remote audio mixer, wherein the second mixer data includes a second audio setting set by a second mobile device.

11. The audio mixing system of claim 9, wherein the updated display screen includes a plurality of faders each corresponding to an audio mixer channel.

12. The audio mixing system of claim 11, wherein the mobile device is further configured to present at least one equalization screen specific to the audio mixer channel corresponding to a selected fader.

13. The audio mixing system of claim 9, wherein the updated display screen includes a graph corresponding to an audio mixer channel.

14. The audio mixing system of claim 13, wherein the audio mixer channel includes at least one input channel and at least one output channel.

15. The audio mixing system of claim 13, wherein the graph is updated in real-time based on the first mixer data.

* * * * *